June 15, 1937.   R. M. GILSON   2,083,647
ELECTRICAL RECTIFIER
Filed Dec. 4, 1934   2 Sheets—Sheet 1

INVENTOR
Robert M. Gilson
BY
HIS ATTORNEY

June 15, 1937.  R. M. GILSON  2,083,647
ELECTRICAL RECTIFIER
Filed Dec. 4, 1934  2 Sheets-Sheet 2

INVENTOR
Robert M. Gilson
BY
HIS ATTORNEY

Patented June 15, 1937

2,083,647

UNITED STATES PATENT OFFICE 2,083,647

ELECTRICAL RECTIFIER

Robert M. Gilson, Pittsburgh, Pa., assignor to The Union Switch & Signal Company, Swissvale, Pa., a corporation of Pennsylvania Application December 4, 1934, Serial No. 755,922

8 Claims. (Cl. 175—366)

My invention relates to electrical rectifiers comprising asymmetric units of the dry disc type. More particularly, my present invention relates to rectifiers of the type disclosed and claimed in Letters Patent of the United States No. 1,640,335, granted to L. O. Grondahl, on August 23, 1927.

One object of my invention is to provide a rectifier stack which is divided into sections in such manner that any section containing a defective asymmetric unit may be removed from the stack and replaced with a new section without breaking the paint seal on the other sections.

Other objects of my invention will appear as the description proceeds.

I will describe three forms of rectifiers embodying my invention, and will then point out the novel features thereof in claims.

Figure 1:
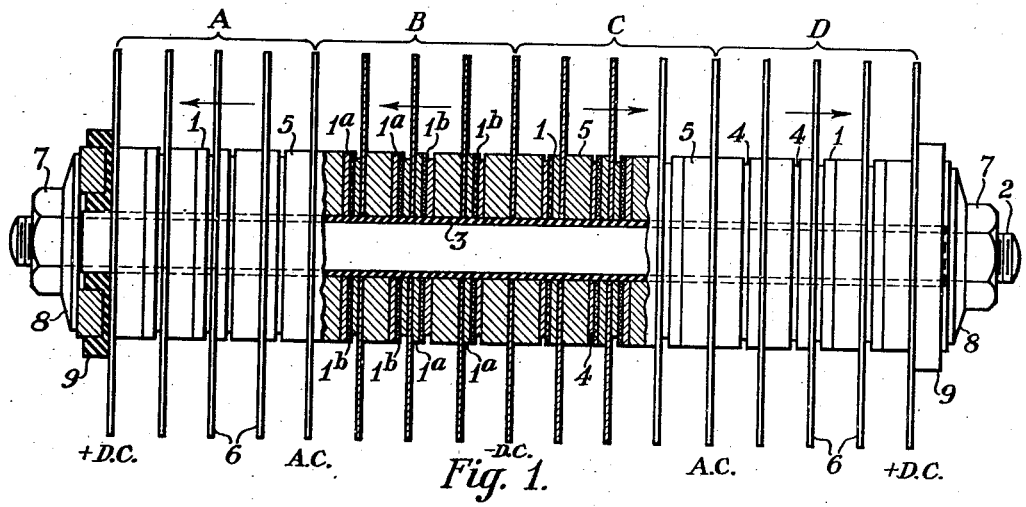
Figure 2:
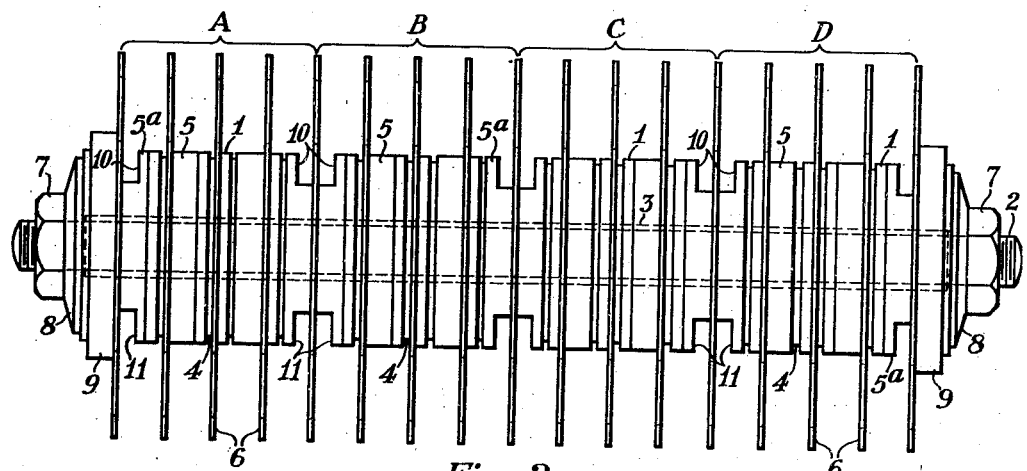
Figure 4:
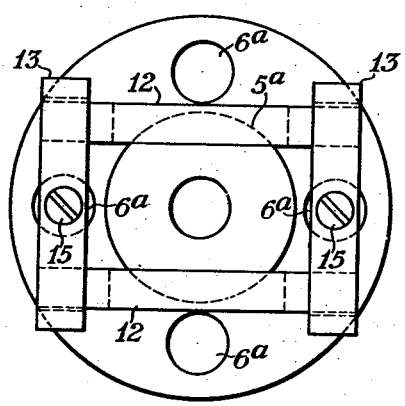
Figure 8:
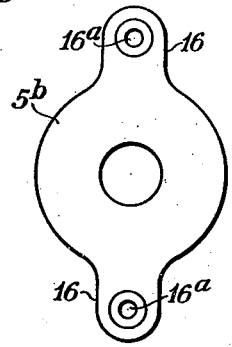
Figure 3:
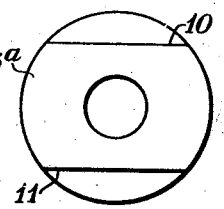
Figure 7:
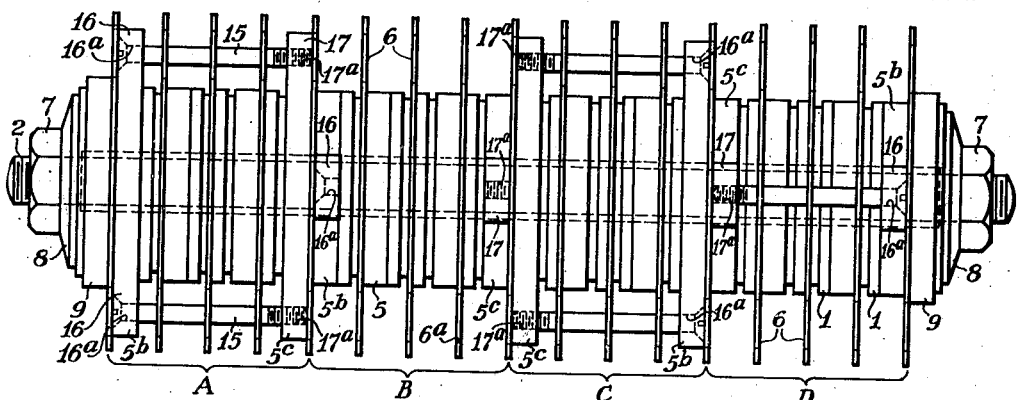
Figure 9:
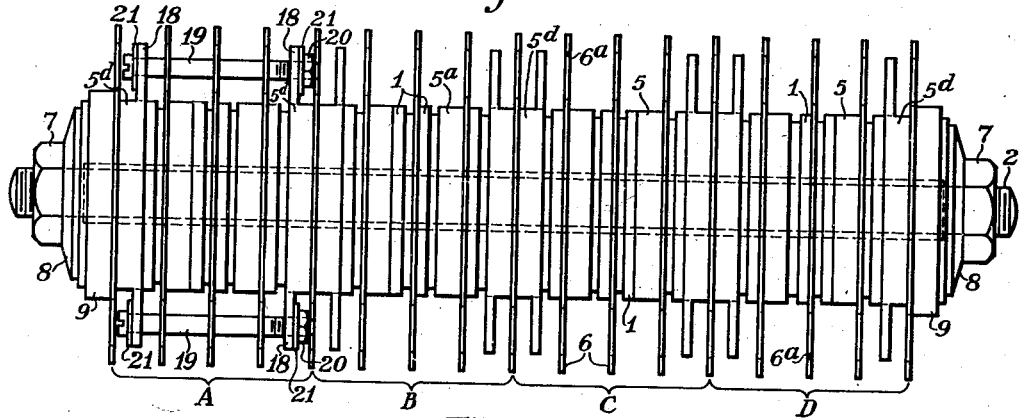
Figure 5:
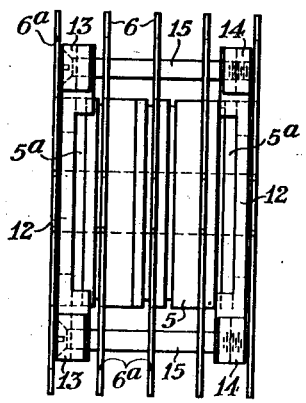
Figure 6:
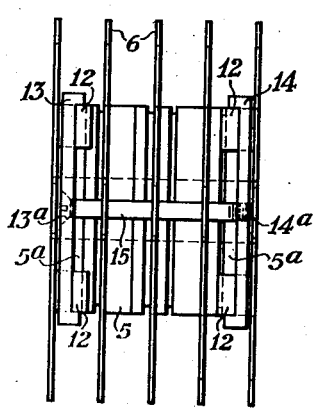
Figure 10:
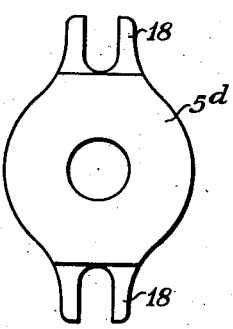

In the accompanying drawings, Fig. 1 is a plan view showing a rectifier constructed in accordance with standard practice. Fig. 2 is a plan view of a rectifier similar to that shown in Fig. 1 constructed in accordance with one form of my invention. Fig. 3 is a detail view of one of the spacer washers 5ª forming part of the rectifier shown in Fig. 2. Figs. 4, 5 and 6 are end, top and side views, respectively, of a replacement section for a rectifier similar to that shown in Fig. 2 with clamping means embodying my invention applied thereto. Fig. 7 is a plan view showing a rectifier similar to that shown in Fig. 1 constructed in accordance with another form of my invention. Fig. 8 is a detail view of one of the spacer washers 5ᵇ forming part of the rectifier illustrated in Fig. 7. Fig. 9 is a plan view showing a rectifier similar to that shown in Fig. 2 constructed in accordance with another form of my invention. Fig. 10 is a detail view of one of the spacer washers 5ᵈ forming part of the rectifier illustrated in Fig. 9.

Similar reference characters refer to similar parts in each of the several views.

Referring first to Fig. 1, the rectifier here shown comprises a stack of asymmetric units 1 assembled on a rod or bolt 2 which passes through suitable openings in the units, but which is insulated from the units by a sleeve 3 of suitable insulating material such as fiber. The asymmetric units 1 may be of any suitable type, but as here illustrated each of these units comprises a flat disc 1ª of metal, such as copper, having a compound 1ᵇ of the metal, such as cuprous oxide, formed thereon. As is well known, units of the type described exhibit the characteristic of offering a lower resistance to current which tends to flow from the oxide to the copper than to current which tends to flow in the opposite direction through the units.

Disposed adjacent the coating 1ᵇ of copper oxide of each unit is a thin layer 4 of an impressionable electrical conducting material, such as lead foil, and interposed at suitable intervals in the stack are spacer washers 5 and fins 6. Each fin 6 is formed of some material which readily conducts heat, such for example as brass, and serves the dual purpose of radiating the heat generated in the units by the power loss in the units, and as a convenient means for making electrical connection with the units at the proper points in the stack. Pressure is applied to the stack to insure good electrical contact between the units, the fins, the spacers, and the conducting members, by means of nuts 7 which are screwed onto the end of the rod 2, and interposed between each nut and the adjacent stack is a spring washer 8 and an insulating washer 9. The spring washers 8 serve to maintain a uniform pressure on the units, while the insulating washers 9 serve to insulate the ends of the stack from the rod 2.

The particular rectifier illustrated is of the full-wave type, and comprises four legs A, B, C and D, each consisting of four asymmetric units 1 in series. The units of the two legs A and B are assembled with the coated side facing toward the right so that these sections will offer the lowest resistance to current tending to flow toward the left through these legs, and the units of the two legs C and D are assembled with the coated side facing in the opposite direction, so that these sections will offer the lowest resistance to current tending to flow toward the right through these legs. With the units assembled in the legs in this manner, the two fins 6 which are located respectively at the junction of the legs A and B, and at the junction of the legs C and D, constitute the alternating current input terminals of the rectifier, the two fins 6 located at the outer ends of the legs A and D, when connected together, constitute the positive direct current output terminals of the rectifier, and the fin 6 located at the junction of the legs B and C constitutes the negative direct current output terminal of the rectifier, as indicated by appropriate markings on the drawings.

Rectifiers of the type described are in widespread use, and their operation is too well understood to require further discussion. In utilizing a rectifier of the type described, it sometimes happens that an asymmetric unit becomes damaged due, for example, to the discharge of a lightning surge through the rectifier, or to the application of an excessive voltage to the rectifier, and when this happens it is desirable to be able to readily replace the defective unit. With a rectifier stack assembled in the manner shown in Fig. 1, this is somewhat difficult, because when the stack is originally assembled, it is coated with a paint seal, and as soon as one of the clamping nuts 7 is unscrewed to release the pressure on the units, the paint seal becomes broken. When this seal is once broken, it is usually necessary to disassemble the whole stack and clean the paint from the various parts before attempting to reassemble any part of the stack, to insure that particles of paint will not have become lodged between the units and the adjacent fins, spacers, or conducting members in a manner which might impair the contact between these parts. Furthermore, when the stack is disassembled, the conducting members 4 frequently become damaged, thus making it necessary to use new conducting members when the stack is reassembled, and hence causing a certain amount of waste of materials. To eliminate these difficulties, and to otherwise facilitate the removal of defective units from a rectifier stack of the type described, I propose to divide the stack into a plurality of sections so constructed that the units and associated parts of each section may be readily clamped together by auxiliary clamping means before the usual clamping means for the stack is loosened. With the stack constructed in this manner, each section may be removed from, and replaced in, the stack as a unitary whole without breaking the paint seal on the units and associated parts of the section, and a section containing a defective unit can be replaced with a replacement section, the units and associated parts of which are shipped from the place of manufacture clamped together in assembled form by auxiliary clamping means similar to that used to clamp the units of the other sections together, as will be described more fully hereinafter.

Referring now to Fig. 2, which shows a rectifier similar to that shown in Fig. 1 constructed in accordance with one form of my present invention, the rectifier here illustrated is divided into sections which may be of any desired number and of any convenient length, but which for convenience in illustrating and describing my invention are shown as being coextensive with the legs of the rectifier; and located at each end of each section in place of the usual spacer washer 5 is a special spacer washer 5ᵃ. Each of these spacer washers is provided in one side with two diametrically opposite notches 10 and 11, as shown in Fig. 3, and is disposed with its notched side facing away from the associated section. The washers 5ᵃ are further so disposed that the notches 10 are all in the same angular position with respect to the rod 2. The fins 6 of the stack shown in Fig. 2 are each provided with two or more holes 6ᵃ (see Fig. 4), and are assembled in the stack in such manner that the corresponding holes in all of the fins are in axial alignment. All of the remaining parts of the stack shown in Fig. 2 are similar to the corresponding parts of the stack shown in Fig. 1.

The washers 5a of each section are adapted to cooperate with suitable clamping means, one form of which I will now describe. Referring to Figs. 4, 5 and 6, the clamping means here shown comprises four clamping straps 12, two clamping straps 13, two clamping straps 14, and two flat-headed machine screws 15. Each clamping strap 12 is provided at one end with an offset portion, as shown in Figs. 5 and 6, and its central portion is of such thickness that it will enter the notch 10 or 11 of a washer 5ᵃ with a small amount of clearance when the washer is assembled in the stack. Each clamping strap 13 is U-shaped, as shown in Fig. 6, and is provided with a centrally located hole 13ᵃ which is countersunk in such manner that the head of one of the screws 15 will fully enter the countersunk portion. Each clamping strap 14 is similar to the clamping strap 13 with the exception that each strap 14 is provided, in place of the centrally located countersunk hole 13ᵃ, with a centrally located screw threaded hole 14ᵃ which is adapted to receive the screw threaded end of one of the screws 15. The lengths of the straps 13 and 14 are such that the two legs of these straps will just clear the upper and lower edges, respectively, of the aligned offset portions of two straps 12 which are disposed in the two notches 10 and 11 of a washer 5ᵃ.

When applying the clamping means just described to a section of a rectifier, the rectifier stack is first placed in a vertical position in a vice or other suitable holding device, and one of the clamping straps 12 is then placed in each notch 10 and 11 in the two end washers 5ᵃ of the section in such manner that the offset portions of the vertically aligned straps extend toward each other. One of the U-shaped clamping straps 13 is next placed in a horizontal position on the offset portions on corresponding ends of the two upper straps 12, and one of the screws 15 is then inserted into the hole in this strap 12 by dropping it through the aligned holes 6ᵃ in the fins 6. The U-shaped strap 14 is next held underneath the offset portions of the two lower straps which are directly below the strap 13, and the associated screw 15 is screwed loosely into the threaded hole in this strap 14 by means of a screw-driver which may be inserted into the saw knife in the screw head through the aligned holes 6ᵃ in the fins 6. The remaining strap 13 is next placed on the two remaining offset portions of the two upper clamping straps 12, and the remaining screw 15 is inserted through the hole 13ᵃ in this strap by dropping the screw through the aligned holes 6ᵃ in the fins 6. The remaining strap 14 is next held underneath the two remaining offset portions of the two lower straps, and the associated screw 15 is screwed loosely into the hole 14ᵃ in this strap. The two screws 15 are then alternately tightened until the desired pressure is exerted on the units and associated parts of the section.

I will now assume that with the rectifier stack constructed in the manner shown in Fig. 2, a unit in section B, for example, of the stack becomes defective, and that it is desired to remove this section. To do this, the units of section A will be clamped together in a manner similar to that just described, and the units of sections C and D will also be jointly clamped together in the same way as the units of section A except that screws 15 having twice the length of those used to clamp the units of section A together will be used. After sections A, C and D have been clamped together, the clamping nut 7 on the end of the rod 2 nearest section A will be unscrewed, and section A and the defective section will then be removed from the rod 2. A new section B, the units of which are clamped together in the same manner that the units of section A are clamped together, will then be placed on the rod after which section A will be replaced. The clamping nut 7 will then be replaced on the rod, and after it has been drawn up to the desired tension, the auxiliary clamping straps will be removed from the various sections. The rectifier will then be ready for use.

Referring now to Fig. 7, the rectifier stack here illustrated is similar to that shown in Fig. 2 with the exception that in Fig. 7 a spacer washer 5$^b$ is provided at the left-hand end of sections A and B, and at the right-hand end of sections C and D, in place of the spacer washers 5$^a$ in Fig. 2, and a spacer washer 5$^c$ is provided at the other end of each section in place of the corresponding spacer washer 5$^a$ in Fig. 2. Each spacer washer 5$^b$ is formed with two diametrically opposite lugs 16 (see Fig. 8), and each spacer washer 5$^c$ is formed with two similar lugs 17. Each lug 16 is provided with a countersunk hole 16$^a$ which is adapted to receive the head and shank of an auxiliary clamping screw in a manner which will be made clear presently, while each lug 17 is provided with a tapped hole 17$^a$ which is adapted to receive the screw threaded end of one of the auxiliary clamping screws. The spacer washers are assembled in the stack in such manner that the holes 16$^a$ in the lug 16 of the spacer washer 5$^b$ at the one end of each section align with one set of holes 6$^a$ in the fins 6 and with the holes 17$^a$ in the spacer washer 5$^c$ at the other end of the same section, and in order to facilitate the application of the clamping screws to, and removal from the sections, the spacer washers in alternate sections are angularly spaced from each other, the preferred spacing being ninety degrees.

With the rectifier stack constructed in this manner if a unit in section B, for example, becomes defective, so that it is desired to replace this section, clamping screws 15 are applied to sections A, C and D, in the manner shown in Fig. 7 before the pressure on the stack is released. The nut 7 nearest section A is then removed from the rod 2, and the adjacent washers 8 and 9 and sections A and B are also removed from the rod 2. A new section B, the units of which are clamped together in the same manner as the units of sections A, C and D is then placed on the rod 2, following which section A is replaced on the rod. The washers 9 and 8, and the nut 7 is then replaced, and after the nut 7 has been tightened to provide the desired tension on the stack, the clamping screws 15 are removed from the stack. The rectifier stack is then ready for use.

One advantage of a rectifier stack constructed in the manner shown in Fig. 7, is that the only extra parts which are required to clamp the units of a section together are two flat-headed machine screws of a type which may be obtained anywhere.

Referring now to Fig. 9, the rectifier here illustrated is similar to that shown in Fig. 2 with the exception that there is provided at each end of each section in place of the spacer washers 5$^a$ shown in Fig. 2, a spacer washer 5$^d$ having two diametrically opposite slotted lugs 18, as shown in Fig. 10. Each lug 18 is made approximately one-half as thick as the thickness of the associated washer, and has one side flush with one side of the washer to provide sufficient clearance between the other side of the lug and the next adjacent fin 6 for the head of a clamping bolt or for a nut. The washers 5$^d$ are assembled into the stack in such manner that the slots in the lugs align with the holes 6$^a$ in the fins 6. With this arrangement, when it is desired to clamp the units of a section together, clamping bolts 19 are inserted through the aligned lugs 18 on the washers 5$^d$ at the opposite ends of the section in the manner shown in connection with section A, and nuts 20 are then screwed onto the bolts, the nuts being alternately tightened until the desired clamping pressure is obtained. Preferably, a washer 21 will be provided on each bolt between the head of the bolt and the adjacent lug 18 and between the associated nut 20 and the adjacent lug 18, for obvious reasons.

It should be particularly pointed out that while I have illustrated my invention in connection with a rectifier stack which of itself comprises a full wave rectifier, my invention is equally applicable to any other type of rectifier stack.

It should also be pointed out that the number of sections into which a stack is divided, and the length of these sections, will depend upon the size and type of the rectifier, and may be varied as conditions require.

Although I have herein shown and described only three forms of electrical rectifiers embodying my invention, it is understood that various changes and modifications may be made therein within the scope of the appended claims without departing from the spirit and scope of my invention.

Having thus described my invention, what I claim is:

1. A rectifier comprising a stack of asymmetric units clamped together on a rod, said asymmetric units being arranged in sections, and a plurality of spacer washers one included in said stack at each end of each section and each formed with means adapted to cooperate with auxiliary clamping means for at times clamping the units of the section together independently of said first mentioned clamping means.

2. A rectifier comprising a stack of asymmetric units clamped together on a rod, said asymmetric units being arranged in sections, cooling fins disposed at intervals in said stack and provided with a plurality of aligned holes, a plurality of spacer washers disposed at intervals in said stack, one such spacer washer being located at each end of each section and each spacer washer which is located at the end of a section being provided with means adapted to cooperate with auxiliary means for clamping the units of the associated section together independently of said rod, said auxiliary means including clamping screws which pass through the aligned holes in said fins.

3. A rectifier comprising a stack of asymmetric units clamped together on a rod, said asymmetric units being arranged in sections, a plurality of spacer washers one included in said stack at each end of each section and each formed with two diametrically opposite notches in one side, and auxiliary clamping means adapted to engage the two washers at the opposite ends of a section at said notches for at times clamping the units of the section together independently of said first mentioned clamping means.

4. In combination, a rectifier section comprising a portion of a stack of asymmetric units, two spacer washers one located at one end of said section and the other located at the other end of said section and each provided in its outer side with two diametrically opposite notches, first and second straps having their central portions disposed respectively in the two notches in said one washer, a third and fourth strap having their central portion disposed respectively in the two notches in said other washer, each of said first, second, third and fourth straps being provided at each end with an offset portion, said washers and said first, second, third and fourth straps being so arranged that said first and second straps align respectively with said third and fourth straps, and that the offset portions of the aligned straps extend toward each other, a first U-shaped strap cooperating with the offset portion on one end of said first and second straps, a second U-shaped strap cooperating with the offset portions at the other end of said first and second straps, said first and second straps each being provided with a centrally located hole, a third U-shaped strap cooperating with the offset portions at one end of said third and fourth straps, a fourth U-shaped strap cooperating with the offset portion at the other end of said third and fourth straps, said third and fourth U-shaped straps being provided with tapped holes which align with the holes in said first and second U-shaped straps, and screws passing through the holes in said first and second straps and screwed into the holes in said third and fourth straps.

5. A rectifier comprising a stack of asymmetric units clamped together on a rod, said asymmetric units being arranged in sections, a plurality of spacer washers one included in said stack at each end of each section and each provided with two diametrically opposite lugs, the lugs on the washer at the one end of each section each being provided with a clearance hole for the reception of the shank of a clamping bolt and the lugs on the washer at the other end of each section each being provided with a tapped hole for the reception of the screw threaded end of a clamping bolt, said washers being so disposed in the stack that the clearance holes in the lugs on the washer at one end of each section align with the tapped holes in the lugs on the washer at the other end of each section.

6. A rectifier comprising a stack of asymmetric units clamped together on a rod, said asymmetric units being arranged in sections, a plurality of spacer washers one included in said stack at each end of each section and each provided with two diametrically opposite lugs, the lugs on the washer at one end of each section each being provided with a clearance hole for the reception of the head and shank of a clamping bolt and the lugs on the washer at the other end of each section each being provided with a tapped hole for the reception of the screw threaded end of a clamping bolt, said washers being so disposed in the stack that the clearance holes in the lugs on the washer at one end of each section align with the tapped holes in the lugs on the washer at the other end of each section, and that the washers in alternate sections are angularly spaced in such manner that the lugs on the washers in alternate sections are out of alignment with each other, and cooling fins disposed at intervals in said stack and each provided with holes which align with the holes in the lugs of said washers to permit the insertion of clamping bolts into the lugs to clamp the units of a section together.

7. A rectifier comprising a stack of asymmetric units clamped together on a rod, said asymmetric units being arranged in sections, a plurality of spacer washers one included in said stack at each end of each section and each provided with two diametrically opposite slotted lugs for the reception of clamping bolts to permit the units of said sections to be at times clamped together independently of said rod, the washers being so disposed that the lugs on the two washers at the opposite ends of each section are in alignment.

8. A rectifier comprising a stack of asymmetric units clamped together on a rod, said asymmetric units being arranged in sections, a plurality of spacer washers one included in said stack at each end of each section and each provided with two diametrically opposite slotted lugs for the reception of clamping bolts to permit the units of said sections to be at times clamped together independently of said rod, the washers being so disposed that the lugs on the two washers at the opposite ends of each section are in alignment, and cooling fins disposed at intervals in said stack and each provided with holes which align with the holes in the lugs on said washers to permit the insertion of clamping bolts into the slots in the lugs to clamp the units of a section together.

ROBERT M. GILSON.